E. R. DULL.
MEANS FOR REPAIRING TIRE CASINGS.
APPLICATION FILED JULY 23, 1917.
1,279,301.
Patented Sept. 17, 1918.
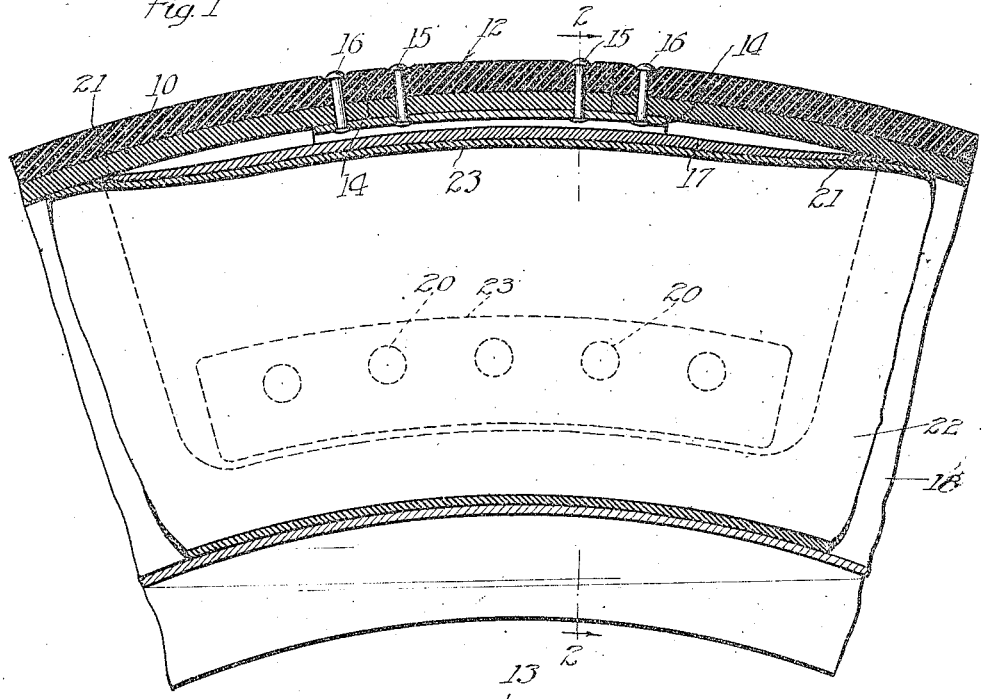
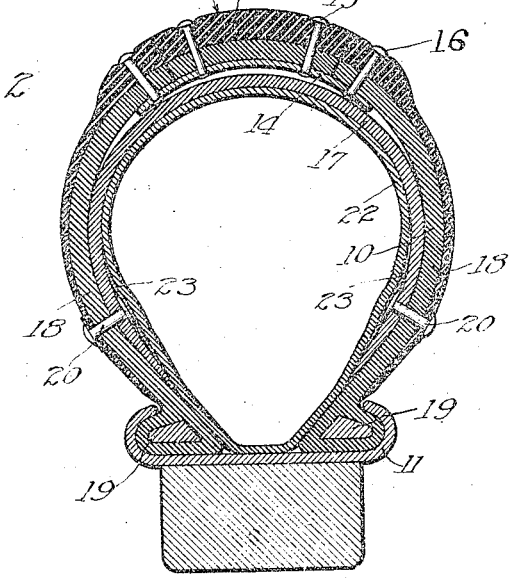
Witnesses:
Arthur H. Carlson
Robert H. Weir
Inventor:
Egbert R. Dull
Jones Baird Cook
Attys.

UNITED STATES PATENT OFFICE.

EGBERT R. DULL, OF CHICAGO, ILLINOIS.

MEANS FOR REPAIRING TIRE-CASINGS.

1,279,301.

Specification of Letters Patent. Patented Sept. 17, 1918.

Application filed July 23, 1917. Serial No. 182,127.

*To all whom it may concern:*

Be it known that I, EGBERT R. DULL, a citizen of the United States, residing at Chicago, in the county of Cook and State of Illinois, have invented certain new and useful Improvements in Means for Repairing Tire-Casings, of which the following is a specification.

This invention relates to improvements in pneumatic tire appliances and methods of repairing tire casings. More particularly the invention relates to a protector and method of reinforcing a weakened area in a tire casing, such as frequently is the result of cuts, disintegration of material, blow outs and other causes.

One of the objects of my invention is to provide a protector for attachment to the interior of a casing so that the weakened area in the casing proper will be relieved to a large extent of outward pressure exerted by the inflated tube.

Another object of my invention is to provide a protector for underlying a weakened area in the casing which has been reinforced by any suitable method, and so position the protector that the outward pressure exerted by the inflated tube will be transmitted largely to the walls of the casing rather than to the weakened area in the tread portion.

Still other and further objects will become readily apparent to those skilled in the art from a consideration of the following description and drawings, wherein—

Figure 1 is a vertical longitudinal sectional view through a pneumatic tire showing my improved protector in place.

Fig. 2 is a transverese sectional view on the line 2—2 of Fig. 1.

It is common practice to repair a weakened portion in the tread of a tire casing by either vulcanizing a new piece of rubber thereover or by attaching a patch to the underside thereof by some mechanical means.

In each instance the weakened area, even though it has been reinforced and strengthened, cannot possibly have the same strength or resistance that the integral unbroken tread portion originally possessed. As a result the extremely high pressure exerted outwardly by the inflated tube frequently causes a disintegration or breaking out of the repaired section with attendant annoyance and expense.

My improved method of making a repair to a weakened area is to first repair the injured casing, either by vulcanizing or inserting a section of rubber and riveting it in place, and then by positioning within the casing opposite the weakened area, a shoe or sheet of material having comparatively high tensile strength and riveting or otherwise fastening the transversely opposite edge portions of the sheet to the walls of the casing in such a manner as to insure the outward pressure exerted by the inflated tube being carried almost entirely by the reinforcement and the sides of the casing instead of being transmitted directly through the shoe to the weakened area of the casing. As a result the weakened portion of the tread is relieved largely of the high pressure exerted by the pneumatic tube and is much less apt to disintegrate in service and again blow out.

Referring now to the specific embodiment of my invention which I have illustrated in the drawings I have shown a section of a pneumatic tire which has been repaired and reinforced by my method. The tire casing indicated by the numeral 10 mounted upon the metal rim 11 is presumed to have had a section or area of its tread weakened as by blow out or cut at the place indicated in general by the numeral 12. The first step in the repair is to cut away the section of casing immediately surrounding the injured portion and insert therein a closely fitting plug or patch of rubber and fabric 13, fitting neatly within the cut away portion so as to entirely fill the opening. A sheet of fabric 14 is secured to the under surface of the plug 13, as by rivets 15, the edge portions of the fabric projecting beyond the opening in which the lug is fitted and being secured to the marginal portion of the casing surrounding the opening by means of other rivets 16. In this manner the weakened portion of the casing is reinforced to a certain extent and sand and water is prevented from working through to the interior of the casing. Vulcanization or other methods may be employed to perform this first step in the repair, the chief object of which is to apply a new traction surface at the injured point of the tread.

Having repaired the broken portion of the casing tread by the above or any other suitable method, I then insert within the casing opposite the injured area, a shoe or patch 17 of material having a comparatively high tensile strength and of a generally rectangular outline, so as to extend circumferentially well beyond the weakened area and transversely down the side walls 18 of the casing toward the casing beads 19. The material of which the sheet is made may be rubber impregnated canvas, such as is used in the construction of the casing itself, or leather, fiber, or other material, having a sufficiently high tensile strength to resist the tension exerted by the high pressure within the pneumatic tube 22, without stretching to such an extent as to transmit this pressure to the tread of the casing proper.

In positioning the sheet of material within the casing, I attach the transversely opposite edge portions to the walls of the casing by means of rivets 20, or other suitable fasteners which will attach the sheet to the walls without likelihood of slipping or loosening. In attaching the edges of the repair shoe to the casing walls it is desirable that the transverse distance on the outer surface of the shoe between the attaching points be less than the distance transversely of the casing on the interior surface thereof between the attaching points so as to space the outer portion of the repair shoe inwardly from the inner surface of the casing tread opposite the weakened area. It is, therefore, apparent that when the tube is inflated the pressure exerted outwardly thereby will be carried largely by the repair shoe and transmitted down to the fastenings at the side walls of the casing instead of being transmitted directly through the shoe to the tread of the casing at the point of weakness.

The longitudinal ends 21 of the repair shoe may be thinned out or stretched so as to permit their contact with the interior of the casing when the tire is inflated and thus prevent the tube when inflated from creeping under the shoe and being injured. Fabric strips 23 are cemented over the inner ends of the rivets to prevent injury to the tube. In the drawings I have made no attempt to proportion the parts accurately, the distance of separation between the shoe and the casing being exaggerated to illustrate more clearly the manner of application.

Whereas I have illustrated and described but a single embodiment of my invention and one method of producing the same, it will be evident to those skilled in the art that many changes and modifications may be made therein without departing from the spirit of the invention or the scope of the appended claim.

Having described my invention, what I claim is:—

The combination with a pneumatic tire casing having a rupture in its tread, of an insert for said rupture to reëstablish the tread surface; a protector for said ruptured part, to be applied within the casing, comprising a generally rectangular sheet of material having relatively high tensile strength, overlying said insert and attached to the casing on each side between the open edge of the casing and said insert, the midportion of said protector spaced apart from said insert, to protect said insert from contact with the inner tube of the tire.

In testimony whereof I hereunto set my hand in the presence of two subscribing witnesses.

EGBERT R. DULL.

In the presence of—
FORÉE BAIN,
STANLEY W. COOK.